US012424762B2

(12) United States Patent
Hsu et al.

(10) Patent No.: US 12,424,762 B2
(45) Date of Patent: Sep. 23, 2025

(54) ANTENNA PACKAGE STRUCTURE

(71) Applicant: Advanced Semiconductor Engineering, Inc., Kaohsiung (TW)

(72) Inventors: Shao-En Hsu, Kaohsiung (TW); Huei-Shyong Cho, Kaohsiung (TW); Shih-Wen Lu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 216 days.

(21) Appl. No.: 18/134,511

(22) Filed: Apr. 13, 2023

(65) Prior Publication Data

US 2024/0347921 A1 Oct. 17, 2024

(51) Int. Cl.

*H01Q 15/00* (2006.01)
*H01Q 1/22* (2006.01)
*H01Q 1/38* (2006.01)

(52) U.S. Cl.

CPC ....... *H01Q 15/0013* (2013.01); *H01Q 1/2283* (2013.01); *H01Q 1/38* (2013.01)

(58) Field of Classification Search

CPC .... H01Q 15/0013; H01Q 1/2283; H01Q 1/38; H01Q 15/0026

See application file for complete search history.

(56) References Cited

U.S. PATENT DOCUMENTS 5,767,789 A * 6/1998 Afzali-Ardakani .......................... H01Q 15/0013 340/572.1
11,031,699 B2 * 6/2021 Maruthamuthu ........ H01Q 1/48
11,322,823 B2 5/2022 Chiu et al.
2009/0273527 A1 * 11/2009 Behdad ............. H01Q 15/0026 343/705
2020/0402931 A1 * 12/2020 Chen .................. H01L 23/3121

FOREIGN PATENT DOCUMENTS

TW I676219 B 11/2019

* cited by examiner

*Primary Examiner* — Seung H Lee
(74) *Attorney, Agent, or Firm* — FOLEY & LARDNER LLP

(57) ABSTRACT

The present disclosure provides an antenna package structure, which includes antenna and a transmitting structure. The transmitting structure includes a first dielectric material and a second dielectric material of different dielectric constants, and a frequency selective surface unit. The first dielectric layer and the second dielectric layer are configured to focus the electromagnetic wave radiated between the antenna and the frequency selective surface unit.

16 Claims, 14 Drawing Sheets

ANTENNA PACKAGE STRUCTURE

BACKGROUND

1. Technical Field

The present disclosure relates to an antenna package structure.

2. Description of the Related Art

Under the AoP application of 5G and 6G bands, radiation loss increases with operating frequency of the antenna. If antenna power is increased to increase the radiation energy, the energy loss will be aggravated and accompanied by the problem of overheating. Existing techniques include disposition of a frequency selective surface (FSS) structure on a surface of a substrate structure, with thickness of the dielectric material in the FSS structure corresponding to the wavelength of electromagnetic waves to be received. However, the technique also disposes the same dielectric material on an opposite surface of the substrate structure for balance thereof. As a result, overall thickness of the substrate structure is significantly increased, impeding miniaturization.

SUMMARY

In some embodiments, an antenna package structure is provided, which includes antenna and a transmitting structure. The transmitting structure includes a first dielectric material and a second dielectric material of different dielectric constants, and a frequency selective surface unit. The first dielectric layer and the second dielectric layer are configured to focus the electromagnetic wave radiated between the antenna and the frequency selective surface unit.

In some embodiments, an antenna package structure is provided, which includes an antenna, a frequency selective surface unit, a first dielectric structure, and a second dielectric structure. The frequency selective surface unit is configured to electrically couple to the antenna; a first dielectric structure disposed between the antenna and frequency selective surface unit. The first dielectric structure has a first dielectric constant; and a second dielectric structure disposed between the first dielectric structure and the antenna. The second dielectric structure comprises a plurality of second dielectric layers that have a second dielectric constant different from the first dielectric constant, and are arranged in a stacked manner.

In some embodiments, an antenna package structure is provided, including a first frequency selective surface unit, a second frequency selective surface unit, and a first dielectric structure. The second frequency selective surface unit is configured for electrically coupling to the first frequency selective surface unit. The first dielectric structure includes a first dielectric layer and a second dielectric layer of different dielectric constants. The first dielectric layer and the second dielectric layer are configured to focus a first electromagnetic wave transmitted between the first frequency selective surface unit and the second frequency selective surface unit.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
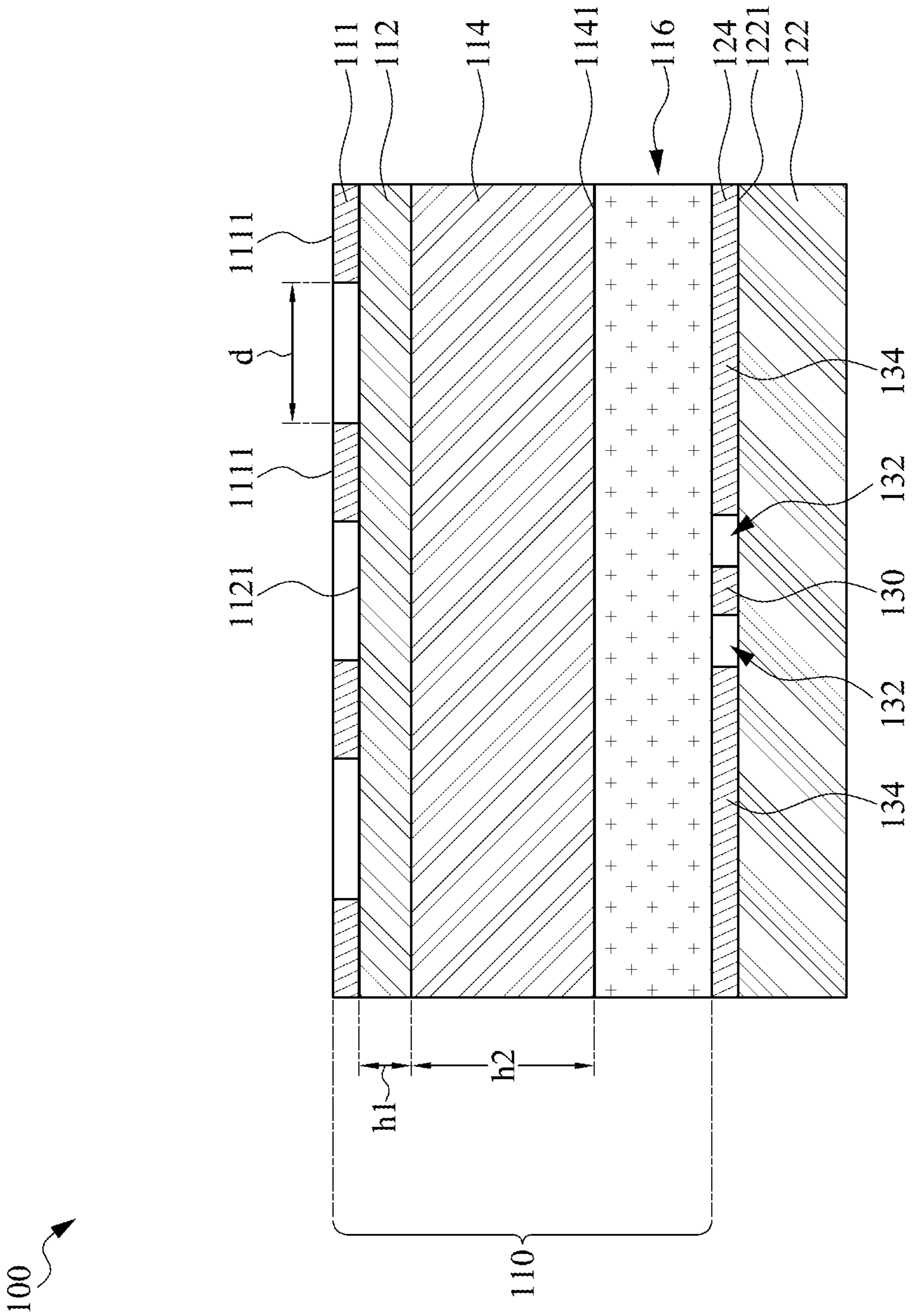
FIG. 1A illustrates a cross-sectional view of an antenna package structure in accordance with an embodiment of the present disclosure.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

The term "layer" as used herein refers to a portion of material comprising a region having a certain thickness. A layer may extend across the entire underlying or superstructure, or may have an extent that is less than the extent of the underlying or superstructure. In addition, a layer may be a region of a homogeneous or heterogeneous continuous structure, the thickness of which is less than that of the continuous structure. For example, a layer may be located between the top and bottom surfaces of the continuous structure or between any pair of horizontal planes therebetween. Layers may extend horizontally, vertically and/or along the tapered surface. A substrate can be one layer, can include one or more layers therein, and/or can have one or more layers thereon, above, and/or below. A layer can include multiple layers. For example, a semiconductor layer may comprise one or more doped or undoped semiconductor layers, and may be of the same or different materials.

It should be noted that the structures, proportions, sizes, etc. shown in the drawings of the specification are only used to match the content recorded in the specification for the understanding and reading of those skilled in the art, and are not used to limit the implementation of this application, so it has no technical substantive meaning. Any modification of structure, change of proportional relationship or adjustment of size, without affecting the effect and purpose of this application, should still fall within the scope of this application. The disclosed technical content must be within the scope covered. At the same time, terms such as "above", "first", "second" and "one" quoted in this specification are only for the convenience of description and are not used to limit the scope of implementation of this application. The change or adjustment of the relative relationship shall also be regarded as the implementable scope of the present application without substantive change in the technical content.

It should also be noted that the longitudinal section corresponding to the embodiments of the present application can correspond to the front view, the transverse section can correspond to the right view, and the horizontal section can correspond to the top view FIG. 1A illustrates a cross-sectional view of an antenna package structure 100 in accordance with an embodiment of the present disclosure.

In some embodiments, the antenna package structure 100 may be or include, for example, an antenna device or an antenna package. In some embodiments, the antenna package structure 100 may be or include, for example, a wireless device, such as user equipment (UE), a mobile station, a mobile device, an apparatus communicating with the Internet of Things (IoT), and others. In some embodiments, the antenna package structure 100 may support fifth generation (5G) communications, such as sub-6 GHz frequency bands and/or millimeter (mm) wave (mmWave) frequency bands. For example, the antenna package structure 100 may incorporate both sub-6 GHz devices and mmWave devices. In some embodiments, the antenna package structure 100 may support communications exceeding 5G or 6G, such as terahertz (THz) frequency.

In an embodiment, the antenna package structure 100 may include an electromagnetic wave focusing structure 110 (e.g., a transmitting structure) and a substrate 122. The electromagnetic wave focusing structure 110 may include a first dielectric layer 112, a second dielectric layer 114, and a connection element 116.

The substrate 122 may be a substrate composed of conductive material and dielectric material. Here, the dielectric material may include organic and/or inorganic substances, wherein the organic substances may be, for example, polyamide (PA) fiber, polyimide (PI), epoxy resin, poly-p-phenylene benzobisoxazole (PBO) fiber, FR-4 epoxy glass cloth laminate, prepreg (PP) (or semi-cured resin), Ajinomoto Build-up Film (ABF), etc. The inorganic substances may be, for example, Si, glass, ceramics, silicon oxide, silicon nitride, tantalum oxide, etc. The conductive material may include a seed layer and a conductive layer. Here, the seed layer can be, for example, titanium (Ti), tungsten (W), nickel (Ni), etc. . . . The conductive layer may be a metal layer such as gold (Au), silver (Ag), aluminum (Al), nickel (Ni), palladium (Pd), copper (Cu) or alloys thereof. In some embodiments, one one more electronic components, such as radio-frequency integrated circuits, may be disposed underneath the substrate 122, and be configured to provide a feed point of the antenna 130.

In some embodiments, the first dielectric layer 112 and the second dielectric layer 114 have a first elevation and a second elevation with respect to the antenna 130, wherein the first elevation is higher than the second elevation. In some embodiments, the first dielectric layer 112 and the second dielectric layer 114 can be implemented by different dielectric materials as described here. It should be noted that the dielectric constant (Dk) of the dielectric material of the first dielectric layer 110 may be different from that of the second dielectric layer 114.

As shown in FIG. 1A, the first dielectric layer 112 may have a top surface 1121. The frequency selective surface unit 111 may include a plurality of patches 1111 disposed on the top surface 1121 of the first dielectric layer 112. The plurality of patches 1111 are arranged in a first pattern. The first pattern may be a two-dimensional array, which is in a fixed pattern or a dynamically adjusted pattern, and the plurality of patches 1111 are equally spaced apart in the two-dimensional array so as to match the operating frequency of the antenna 130. In some embodiments, the size of the patches 1111 and the gap between neighboring patches 1111 correspond to the operating frequency of the antenna 130. For example, when the operating frequency of the antenna 130 is higher, the patches 1111 are smaller as is the gap between neighboring patches 1111. When the operating frequency of the antenna 130 is lower, the patches 1111 are larger as is the gap between neighboring patches 1111. In other words, when the operating frequency of the antenna 130 increases, the number of patches 1111 increases commensurately within a given unit area. Similarly, decreased operating frequency of the antenna 130 reduces the number of patches 1111 within the given unit area.

More specifically, the frequency selective surface unit 111 is a thin, repetitive surface designed to reflect, transmit, or absorb electromagnetic fields based on the frequency of the field. In some embodiments, the patches 1111 may be square, hexagonal, circular, square, hexagonal loop, circular loop, anchor, or other, depending on practical needs of the antenna package structure 100, but the present disclosure is not limited thereto. In some embodiments, the frequency selective surface unit 111 may be implemented by a conductive layer with a plurality of apertures, where the conductive layer may be a metal layer, and the arrangement of the apertures is designed so that the resonant frequency of the apertures (i.e., FSS elements) matches the frequency of the electromagnetic wave emitted by the antenna 130.

In some embodiments, the gap 'd' between neighboring patches 1111 can be expressed by formula (1) as follows.

$$0.2\lambda_g \leq d \quad (1)$$

wherein $\lambda_g$ denotes the wavelength in the medium for the operating frequency.

In some embodiments, the connection element 116 connects the electromagnetic wave focusing structure 110 and the substrate 122. For example, the second dielectric layer 114 may have a bottom surface 1141 and a conductive element 124 disposed on a top surface 1221 of the substrate 122. An upper side of the connection element 116 may be connected to the bottom surface 1141 of the second dielectric layer 114, and a bottom side of the connection element 116 may be connected to the substrate 122 via the conductive element 124, as shown in FIG. 1A.

Specifically, the electromagnetic wave focusing structure 110 and the substrate 122 are physically spaced apart, and coupled through the connection element 116. The electromagnetic wave focusing structure 110 and the substrate 122 may be respectively manufactured, and coupled to form the antenna package structure 100.

In some embodiments, the first dielectric constant (e.g. Dk1) of the first dielectric material of the first dielectric layer 112 is greater than the second dielectric constant (e.g., Dk2) of the second dielectric material of the second dielectric layer 114. For example, the ranges of the first dielectric constant (e.g., Dk1) and the second dielectric constant (e.g., Dk2) can be as shown in formulae (2) and (3) as follows.

$$7 \leq Dk1 \leq 100 \quad (2)$$

$$1 \leq Dk2 \leq 5 \quad (3)$$

In addition, the first dielectric layer 112 is substantially parallel to the second dielectric layer 114. The thickness (i.e., heights) of the first dielectric layer 112 and the second dielectric layer 114 may be expressed as h1 and h2, respectively. The range of the thickness h2 can be expressed by formula (4) as follows.

$$0.1\lambda_g \leq h2 \leq 1\lambda_g \quad (4)$$

wherein $\lambda_g$ denotes the wavelength in the medium for the operating frequency. In this case, the medium refers to the second dielectric material of the second dielectric layer 114. The thickness h1 of the first dielectric layer 112 is not particularly limited, and an appropriate thickness can be used.

Figure 1B:
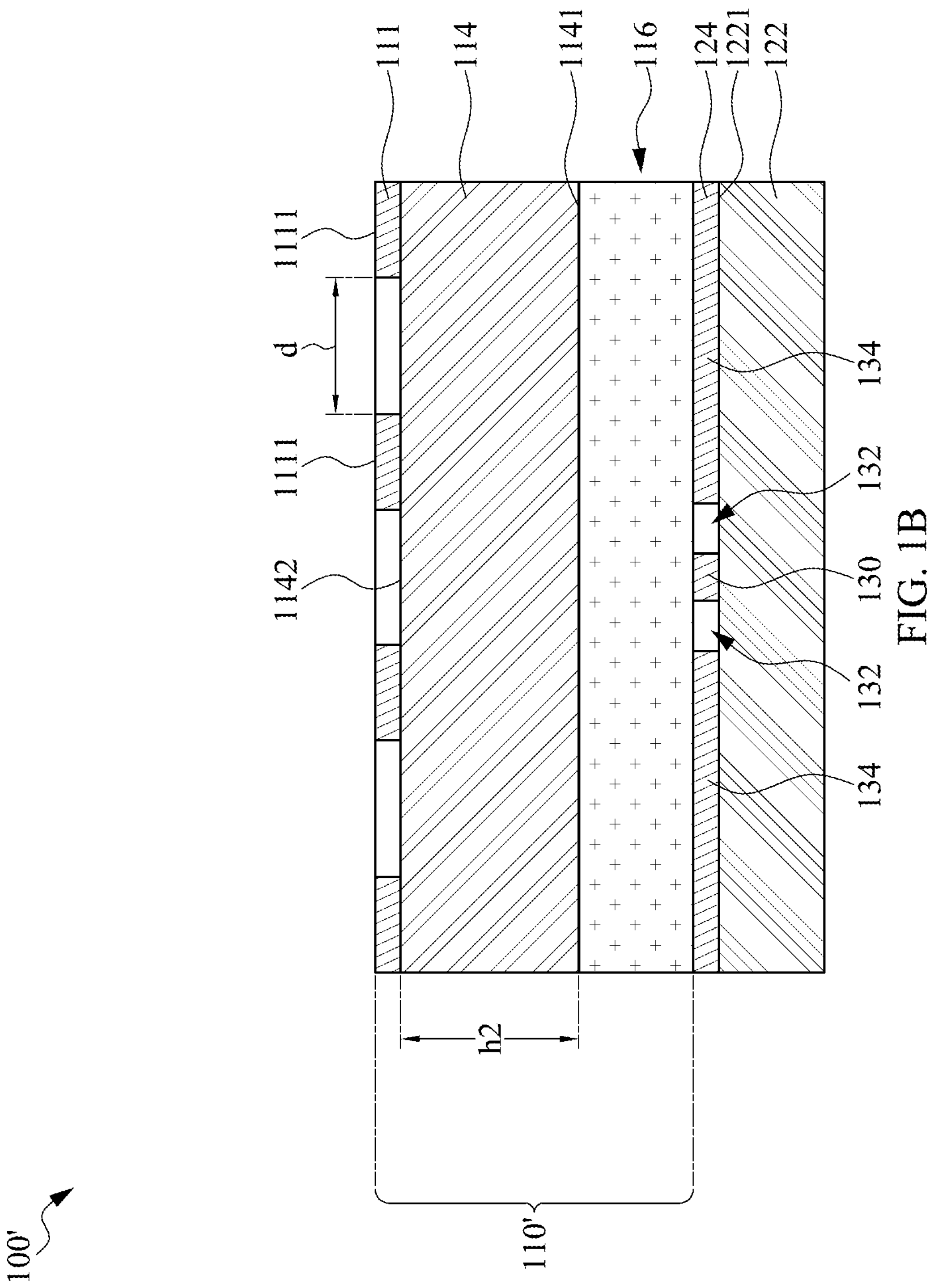
FIG. 1B illustrates a cross-sectional view of an antenna package structure in accordance with another embodiment of the present disclosure.

FIG. 1B illustrates a cross-sectional view of an antenna package structure in accordance with another embodiment of the present disclosure.

The antenna package structure 100' shown in FIG. 1B is similar to the antenna package structure 100 shown in FIG. 1A, with the difference therebetween that the first dielectric layer 112 is not included in the electromagnetic wave focusing structure 110' in FIG. 1B. Specifically, the frequency selective surface unit 111 can be disposed on the top surface 1141 of the second dielectric layer 114. The electromagnetic wave focusing structure 110' in FIG. 1B may have a similar electromagnetic wave focusing function to the electromagnetic wave focusing structure 110 in FIG. 1A since the electromagnetic wave emitted by the antenna 130 may first enter the connection element 116, which may be an air cavity when solder balls are used (e.g., shown in FIG. 2B), or an adhesive having a dielectric constant lower than 1 (e.g., shown in FIG. 2A). Then, the emitted electromagnetic wave may enter the second dielectric layer 114, which has a second dielectric material with a relatively higher dielectric constant (e.g., Dk2), from the connection element 116 having a relatively lower dielectric constant (e.g., air or an adhesive with a low dielectric constant). Thus, the electromagnetic wave refracted by the second dielectric layer 114 will be closer to the normal of the boundary between the second dielectric layer 114 and the connection element 116, with more details provided in the embodiment of FIG. 3A. For purposes of description, in the following embodiments, the antenna package structure 100 shown in FIG. 1A will be used.

Figure 2A:
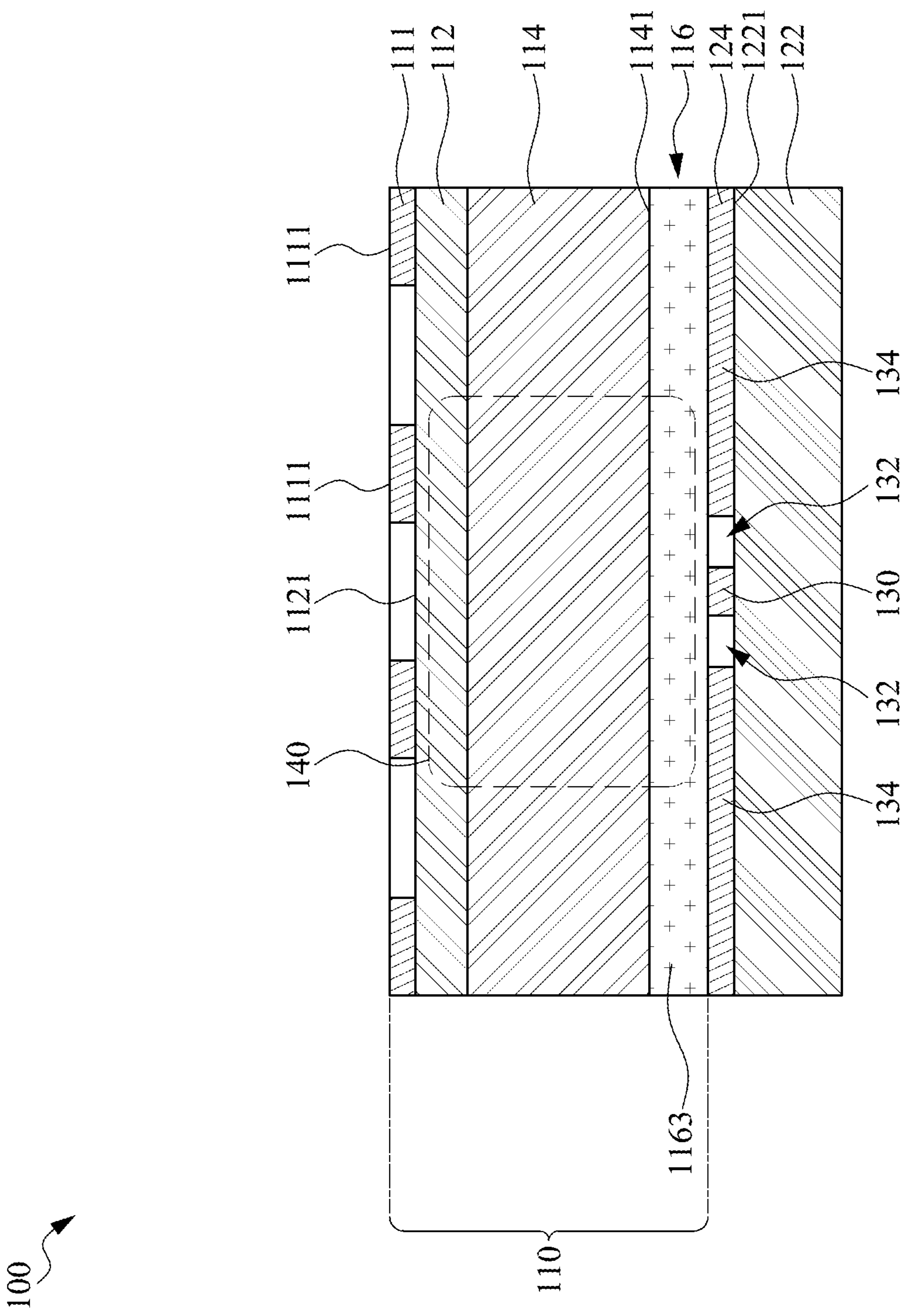
FIGS. 2A-2B illustrates different cross-sectional views of the antenna package structure in accordance with the embodiment of FIG. 1A.
Figure 2B:
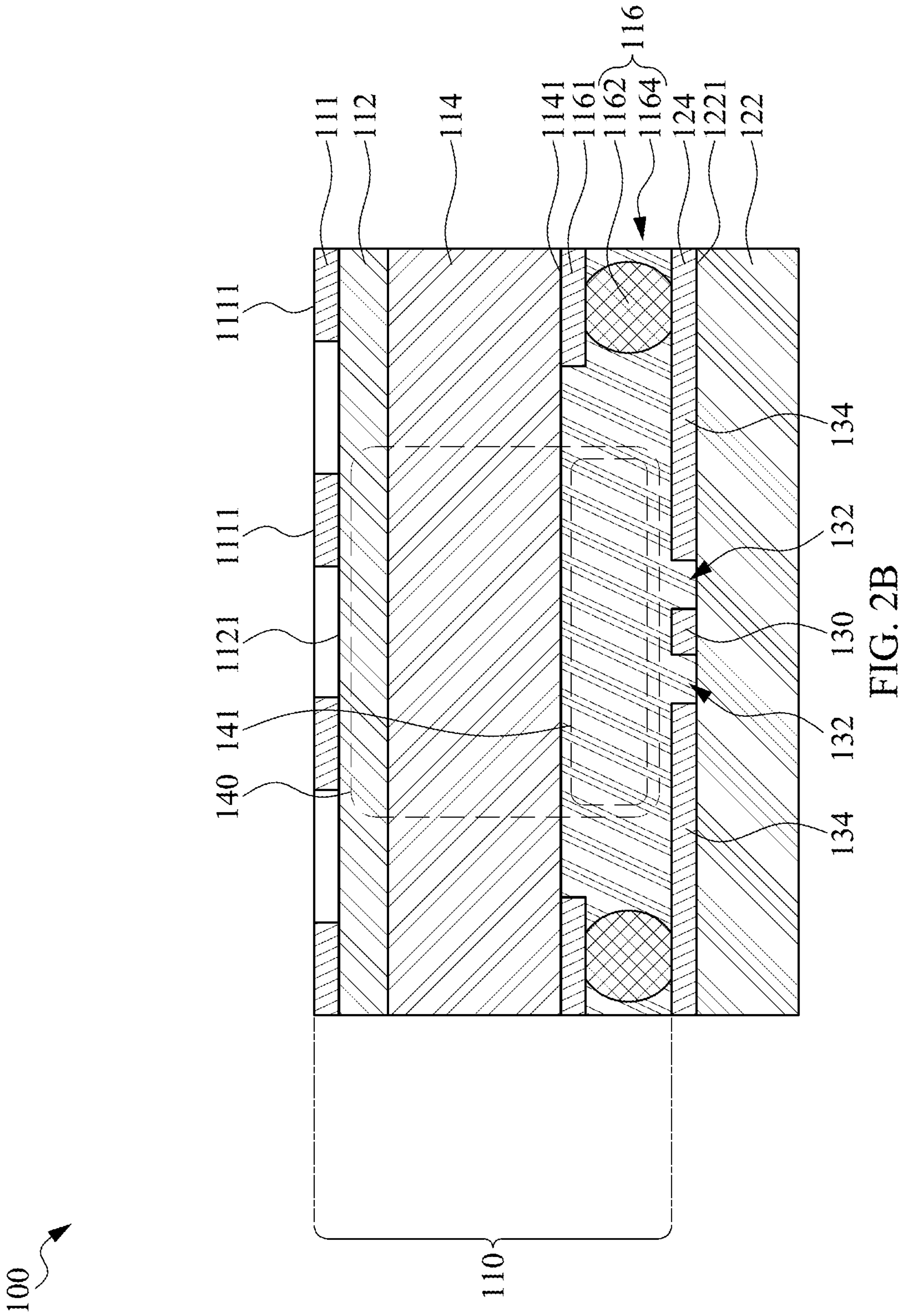

FIGS. 2A-2B illustrates different cross-sectional views of the antenna package structure in accordance with the embodiment of FIG. 1A. Please refer to FIG. 1A and FIGS. 2A-2B.

In some embodiments, the connection element 116 may include an adhesive 1163, as shown in FIG. 2A. For example, the adhesive 1163 may be glue, cement, mucilage, or paste, but the present disclosure is not limited thereto. In some embodiments, the patches 1111 of the frequency selective surface unit 111 and the substrate 122 may define a resonant cavity 140. The electromagnetic wave focusing structure 110 may enhance the gain and directivity of the antenna 130.

Figure 2D:
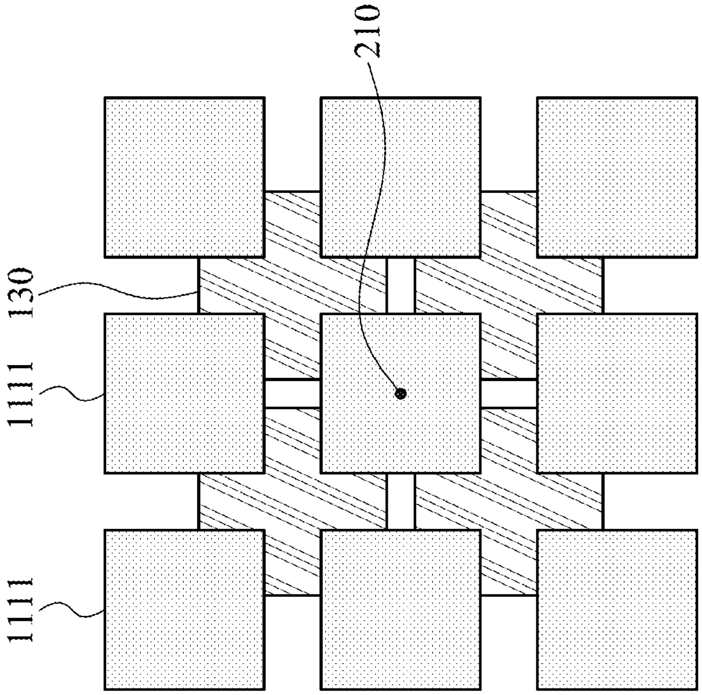
FIGS. 2C and 2D are top views of the antenna package structure in accordance with the embodiment of FIG. 2A.
Figure 2C:
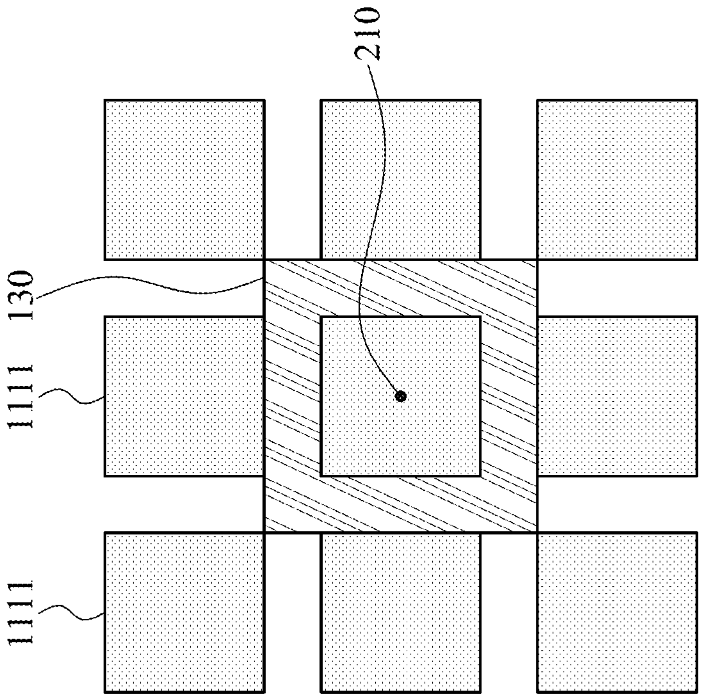

In some other embodiments, the connection element 116 may include a plurality of soldering materials 1162 and a filling material 1164, as shown in FIG. 2B. For example, one or more conductive pads 1161 may be disposed on the bottom surface 1141 of the second dielectric layer 114. The one or more conductive pads 1161 may be conductive patches. In some embodiments, the conductive patches may be metal patches. In some embodiments, the filling materials 1164 may be underfill. The soldering materials 1162 and the filling material 1164 may be of different materials. In some other embodiments, the filling material 1164 may be an adhesive. Each of the soldering materials 1162 may connect the corresponding conductive pad 1161 and the conductive element 124 to connect the electromagnetic wave focusing structure 110 to the substrate 122, as shown in FIG. 2B. In some embodiments, one or more antenna 130 may be arranged in a first pattern, and the patches 1111 of the frequency selective surface unit 111 may be arrange in a second pattern, and the first pattern may cover the second pattern, as shown in FIG. 2C and FIG. 2D. In addition, the soldering materials 1162 may be used for self-alignment, so a geometry center of first pattern of the one or more antenna 130 may be located at point 210, and the geometry center of the patches 1111 of the frequency selective surface unit 111 may also be located at point 210. That is the geometry center of the antenna 130 may substantially align with a geometry center of the frequency selective surface unit 111. It should be noted that the patches 1111 of the frequency selective surface unit 111 and the substrate 122 may define a resonant cavity 140. In addition, the bottom surface 1141 of the second dielectric layer 114 and the substrate 122 may define an air cavity 141. In some embodiments, 130 may denote an antenna array, which has a geometric center at point 210. In addition, the geometric center of the frequency selective surface unit 111 may also be located at point 210. In other words, the geometric center of the antenna array 130 may substantially align the geometry center of the frequency selective surface unit 111.

Specifically, the conductive element 124 is disposed on the top surface 1221 of the substrate 122, and the conductive element 124 may be implemented using a metal, such as gold (Au), silver (Ag), aluminum (Al), nickel (Ni), palladium (Pd), copper (Cu) or alloys thereof, but the present disclosure is not limited thereto. The conductive element 124 may include an antenna 130 and a plurality of conductive pads 134. In some embodiments, the conductive pads 134 may be conductive patches such as metal patches. There is a gap 132 between the antenna 130 and the conductive pad

134. The conductive pads 134 may be grounded so as to reduce interference to the electromagnetic waves emitted by the antenna 130. The antenna 130 may refer to a standalone antenna or a plurality of antennas (e.g., patch antennas) arranged in a two-dimensional array in the top view (not shown). In addition, the range of the frequency selective surface unit 111 may cover the range of the antenna 130 (or antenna pattern) so as to focus the electromagnetic waves emitted by the antenna 130. In some embodiments, the gap 132 may extend to the connection element 116, and the connection element 116 may be filled with air.

Figure 3A:
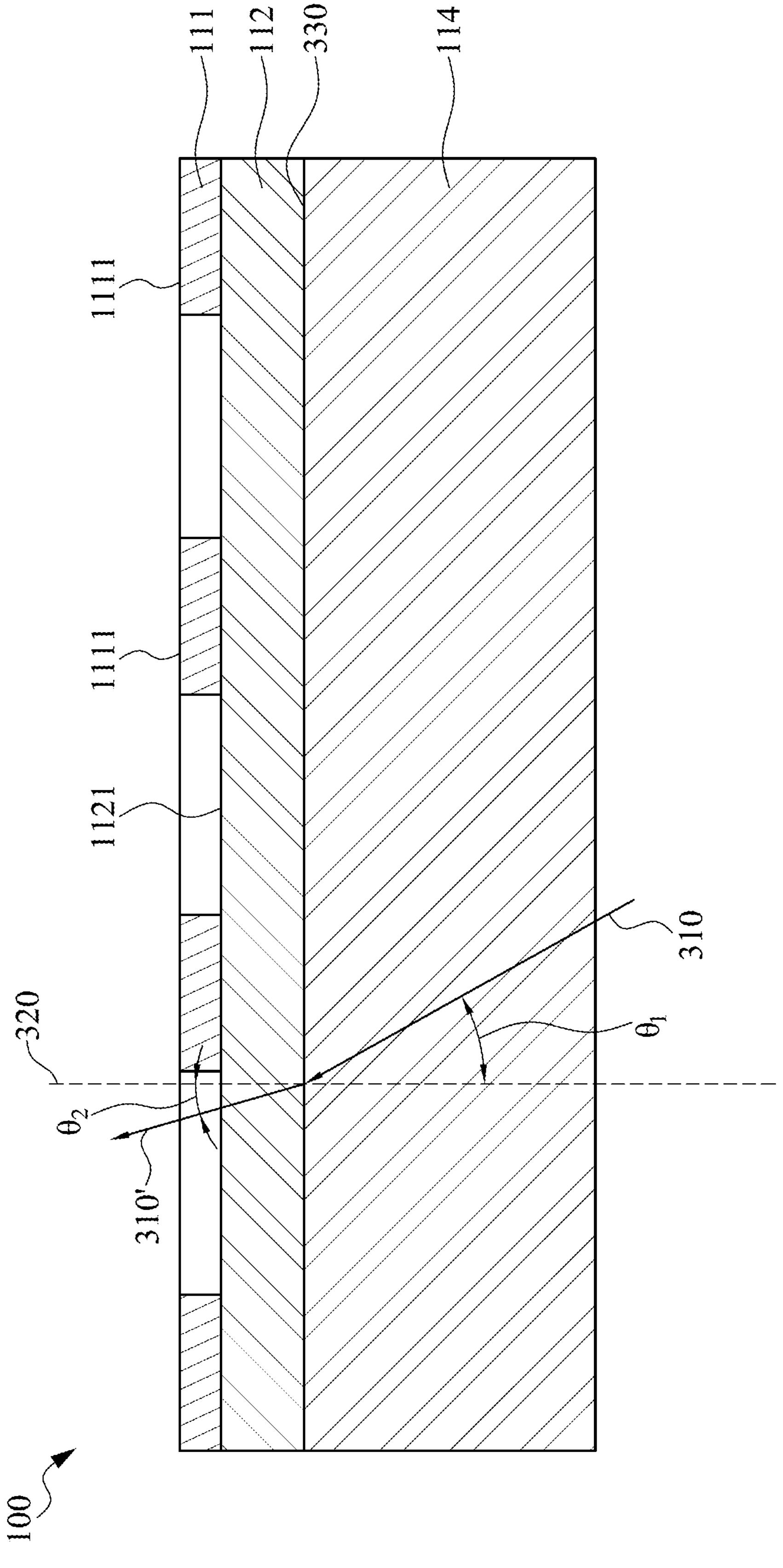
FIG. 3A is a diagram illustrating the incident angle and refraction angle of the electromagnetic wave emitted by the antenna toward the electromagnetic wave focusing structure in accordance with the embodiment of the FIG. 1A.
Figure 3B:
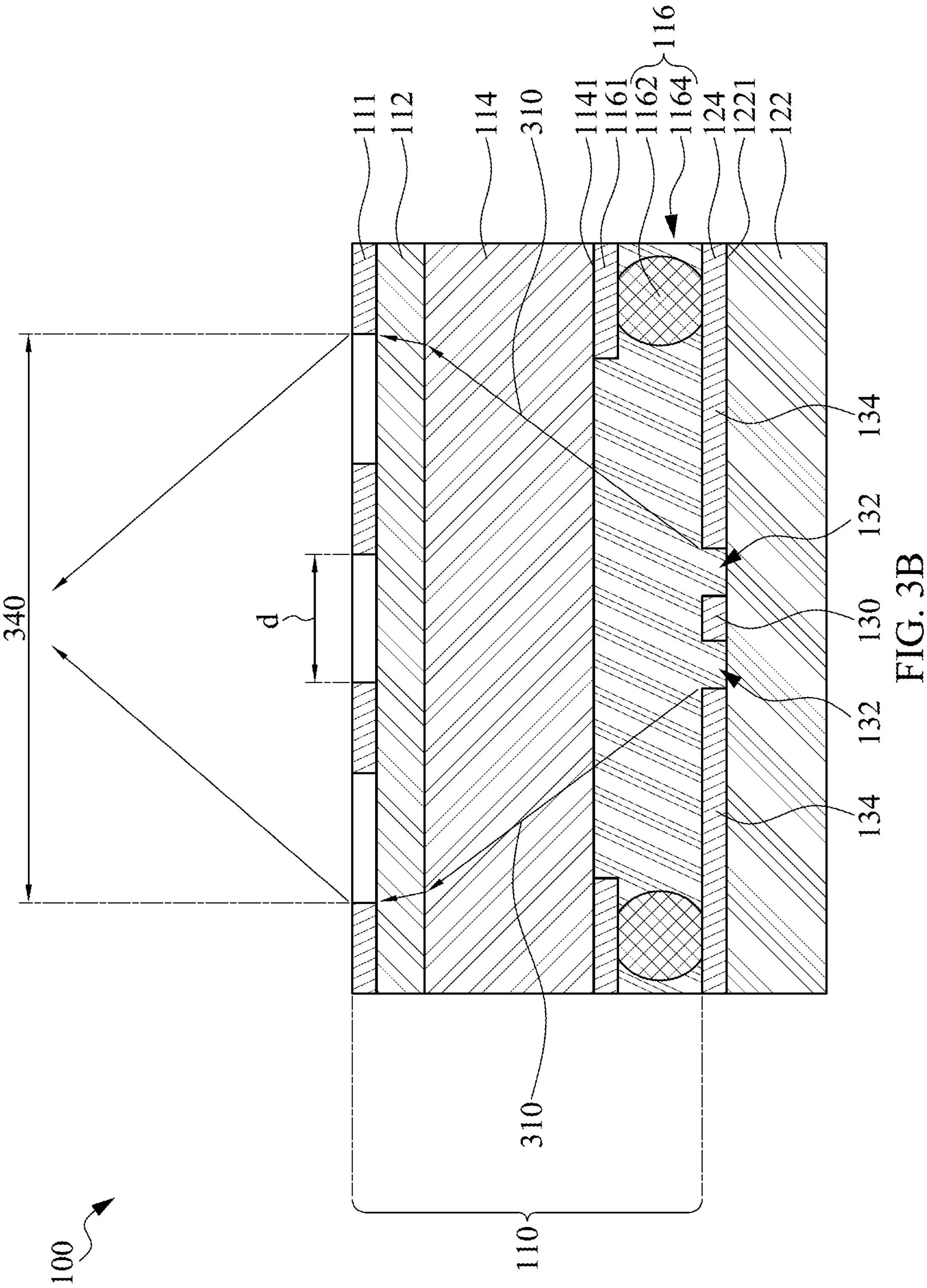
FIGS. 3B-3C are diagrams illustrating the electromagnetic wave emitted by the antenna focused by the electromagnetic wave focusing structure in accordance with the embodiment of FIG. 1A.
Figure 3C:
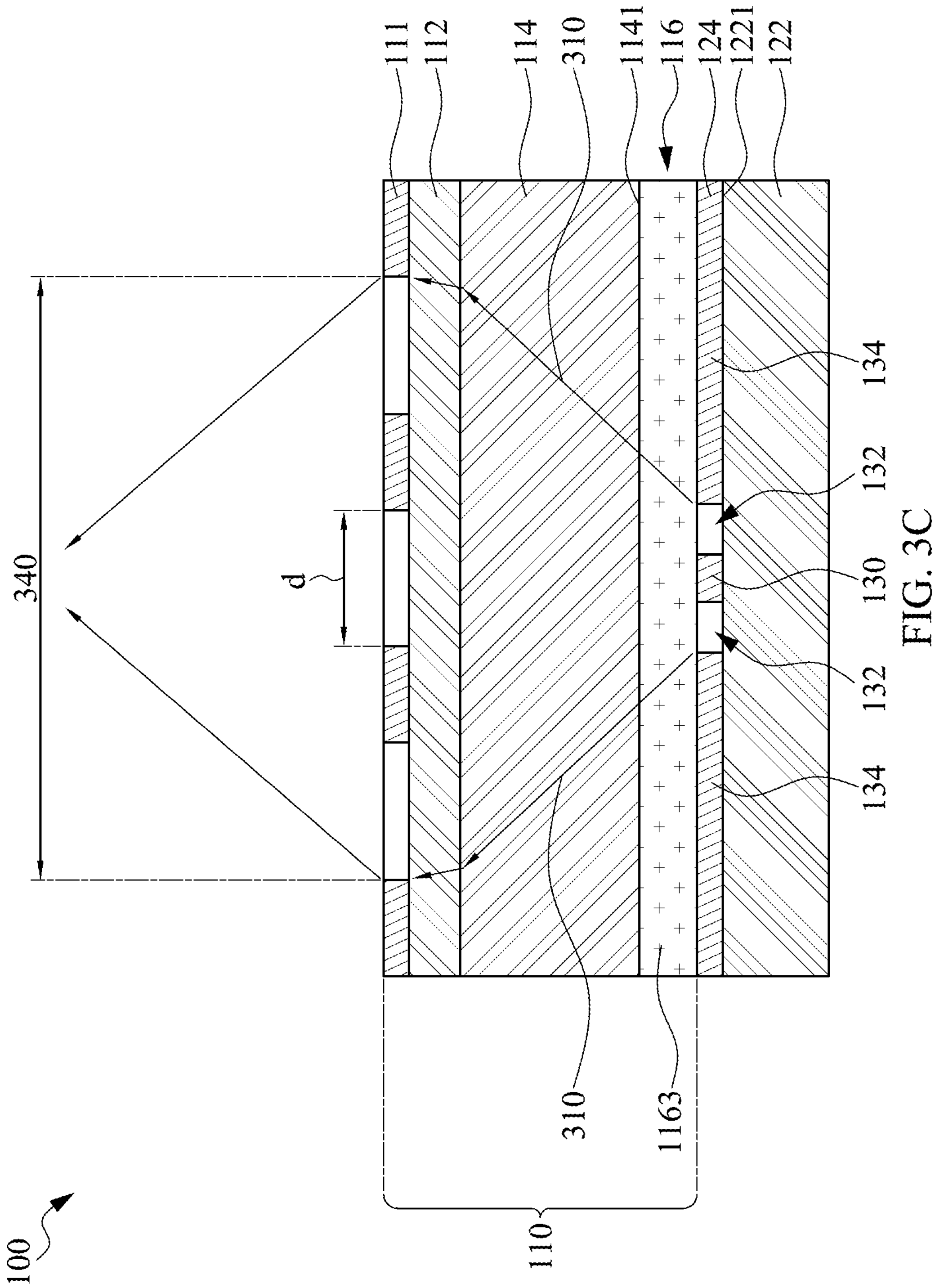

FIG. 3A is a diagram illustrating the incident angle and refraction angle of the electromagnetic wave emitted by the antenna toward the electromagnetic wave focusing structure in accordance with the embodiment of the FIG. 1A. FIGS. 3B-3C are diagrams illustrating the electromagnetic wave emitted from the antenna being focused by the electromagnetic wave focusing structure in accordance with the embodiment of FIG. 1A. Please refer to FIG. 1A and FIGS. 3A-3C.

In some embodiments, the thickness of the first dielectric layer 112 is less than that of the second dielectric layer 114 so as to focus the electromagnetic waves emitted by the antenna 130, as shown in FIG. 1A and FIGS. 2A-2B. In addition, the first dielectric constant (e.g. Dk1) of the first dielectric material of the first dielectric layer 112 is greater than the second dielectric constant (e.g., Dk2) of the second dielectric material of the second dielectric layer 114.

In FIG. 3A, a portion of the electromagnetic wave focusing structure 110 in FIG. 1A is shown. The electromagnetic wave 310 emitted by the antenna 130 toward the plurality of patches 1111 has an incident angle $\theta_1$ between the emitted electromagnetic wave 310 and a normal 320 of the boundary 330 between the first dielectric layer 112 and the second dielectric layer 114. In addition, the electromagnetic wave 310' is refracted by the first dielectric layer 112, and the refracted electromagnetic wave 310' has a refraction angle between the refracted electromagnetic wave 310' and the normal 320 of the boundary 330 between the first dielectric layer 112 and the second dielectric layer 114. It should be noted that no matter whether the connection element 116 is implemented by one or more soldering materials 1162 in FIG. 2B or an adhesive 1163 in FIG. 2A, the electromagnetic wave focusing structure 110 can still operate to focus the electromagnetic waves emitted by the antenna 130.

Please refer to FIG. 3B. The antenna package structure 100 shown in FIG. 2B is used in FIG. 3B, where the connection element 116 includes one or more soldering materials 1162 and a filling material 1164. The one or more soldering materials 1162 may be configured to connect the electromagnetic wave focusing structure 110 to the substrate 122. In some embodiments, the filling materials 1164 may be underfill. The soldering materials 1162 and the filling material 1164 may be of different materials. In some other embodiments, the filling material 1164 may be an adhesive. In addition, the directions of the electromagnetic waves 310 emitted by the antenna 130 may be not limited to the direction of the electromagnetic wave 310 shown in FIG. 3A, and these electromagnetic waves 310 may be omnidirectional. That is, the antenna 130 may radiate energy approximately equally in all horizontal directions. Thus, the electromagnetic waves 310 emitted by the antenna 130 may travel to the gaps in the frequency selective surface unit 111 through the connection element 116, the second dielectric layer 114, and the first dielectric layer 112 in sequence. In addition, the electromagnetic waves 310 may be refracted by the second dielectric layer 114 when passing the boundary between the connection element 116 and the second dielectric layer 114, and they are refracted again by the first dielectric layer 112 when passing the boundary between the first dielectric layer 112 and the second dielectric layer 114.

However, due to the design of the electromagnetic wave focusing structure 110, which includes the first dielectric layer 112 and the second dielectric layer 114 with different dielectric constants (i.e., Dk2<Dk1), the refracted electromagnetic waves 310 near the normal of the boundary between the first dielectric layer 112 and the second dielectric layer 114. As a result, the electromagnetic waves 310 emitted by the antenna package structure 100 can be approximately focused within range 340 which is substantially a cylindrical space above the antenna package structure 100. Therefore, the directivity of the antenna 130 can be improved using the electromagnetic wave focusing structure 110, as shown in FIG. 3B.

Please refer to FIG. 3C. The antenna package structure 100 shown in FIG. 2A is used in FIG. 3C, and the connection element 116 includes an adhesive 1163 to connect the electromagnetic wave focusing structure 110 to the substrate 122. The antenna package structure 100 shown in FIG. 3C has a similar effect of focusing the electromagnetic waves emitted by the antenna 130 as the antenna package structure shown in FIG. 3B. The electromagnetic waves 310 emitted by the antenna package structure 100 can be approximately focused within range 340 which is substantially a cylindrical space above the antenna package structure 100. Therefore, the directivity of the antenna 130 can be improved using the electromagnetic wave focusing structure 110, as shown in FIG. 3C.

Figure 4A:
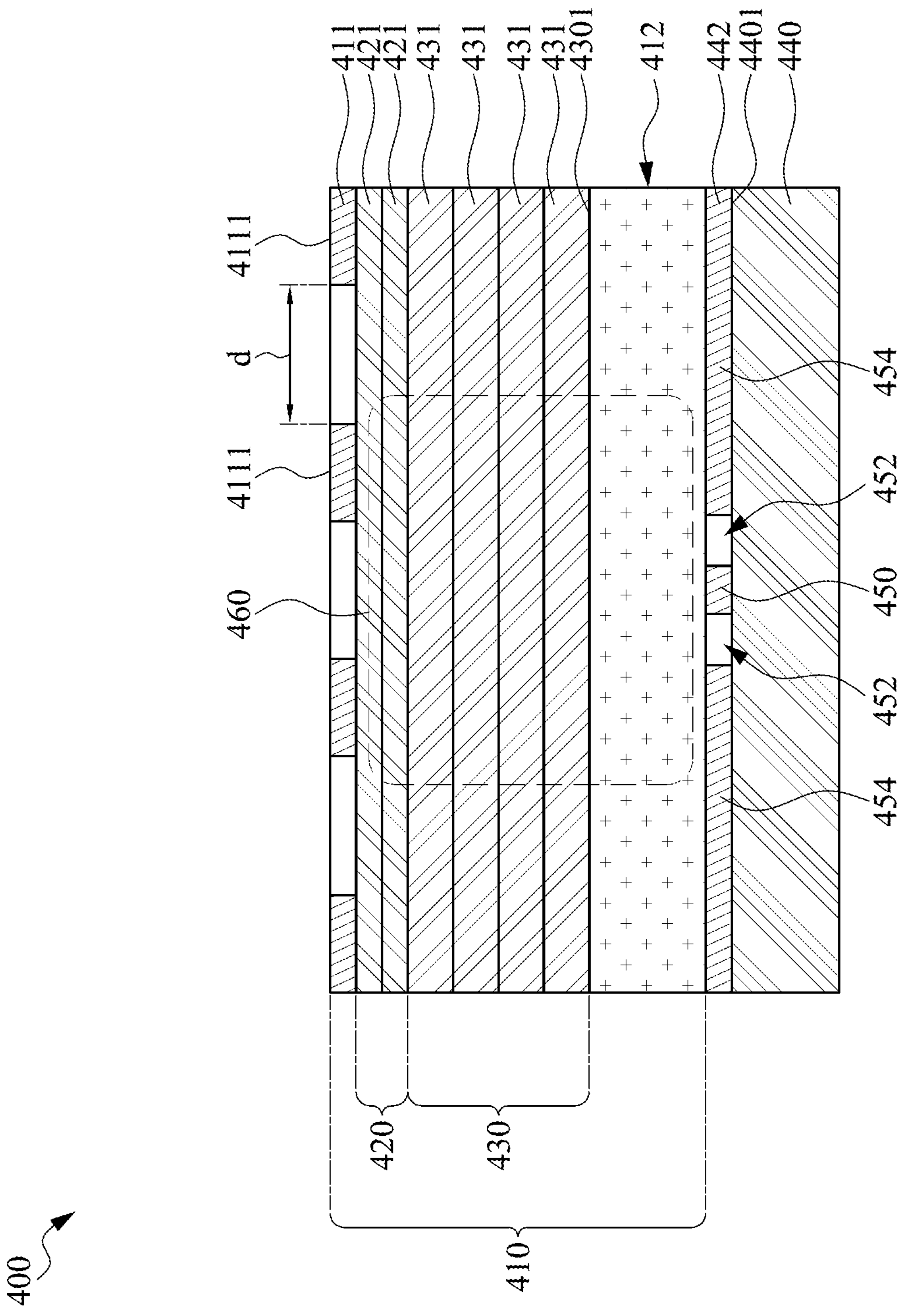
FIG. 4A illustrates a cross-sectional view of an antenna package structure in accordance with another embodiment of the present disclosure.
Figure 4B:
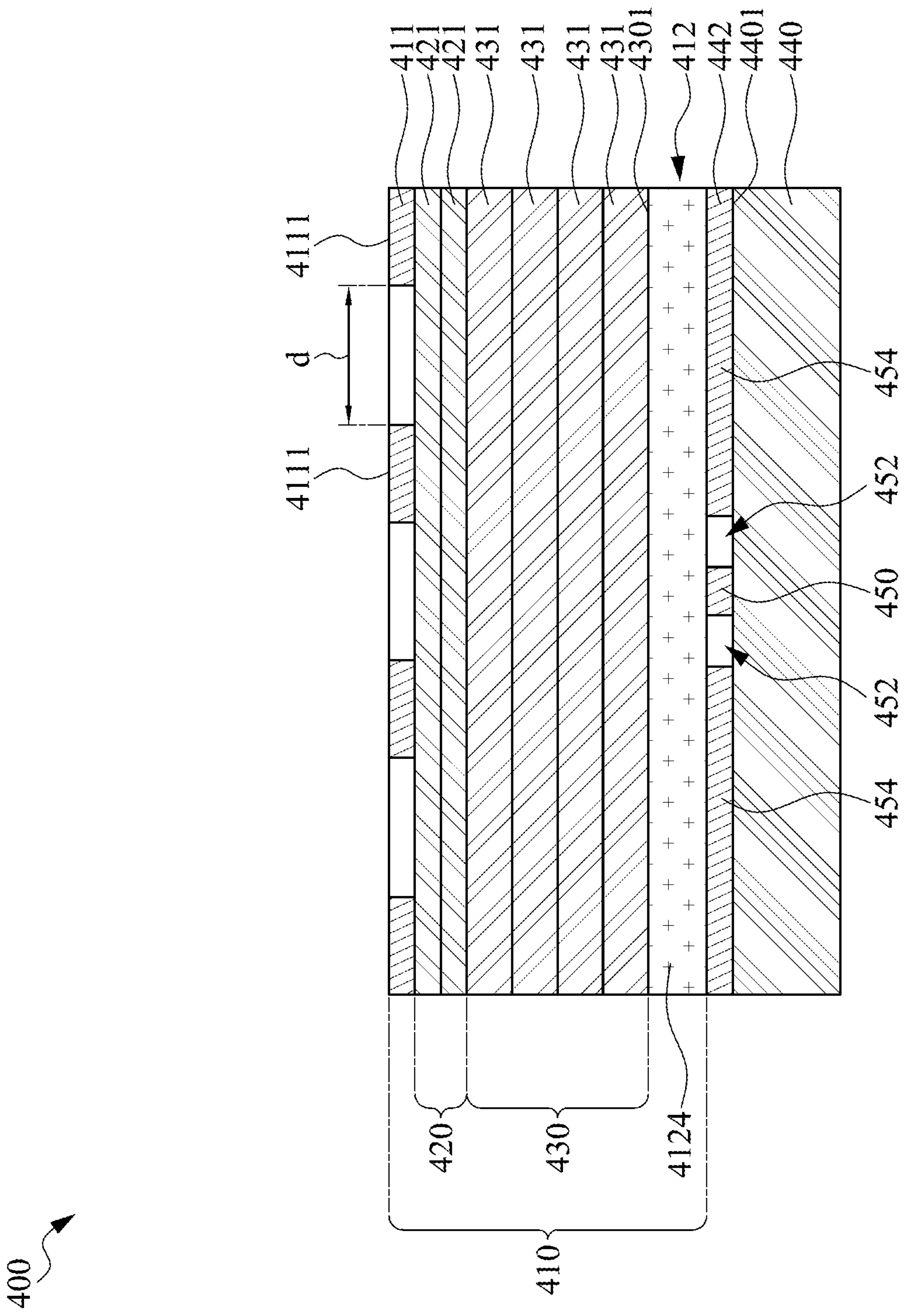
FIGS. 4B and 4C illustrates different cross-sectional views of the antenna package structure in accordance with the embodiment of FIG. 4A.
Figure 4C:
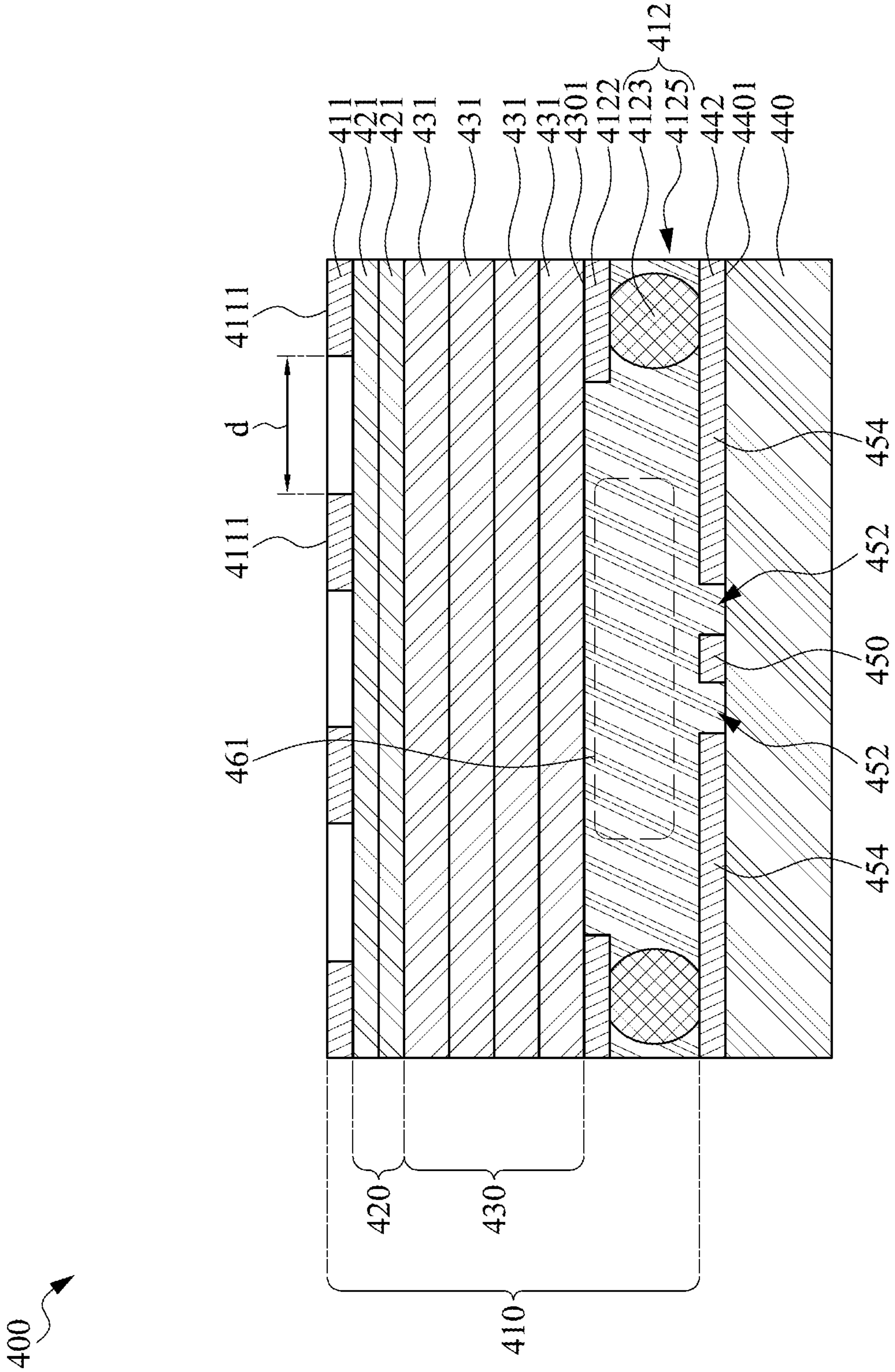

FIG. 4A illustrates a cross-sectional view of an antenna package structure in accordance with another embodiment of the present disclosure. FIGS. 4B and 4C illustrates different cross-sectional views of the antenna package structure in accordance with the embodiment of FIG. 4A. Please refer to FIGS. 4A-4C.

The antenna package structure 400 may include an electromagnetic wave focusing structure 410 and a substrate 440, as shown in FIG. 4A. The electromagnetic wave focusing structure 410 may include a first dielectric structure 420 and a second dielectric structure 430. In some embodiments, the first dielectric structure 420 may include a plurality of first dielectric layers 421 that are arranged in a stacked manner, and the second dielectric structure 430 may include a plurality of second dielectric layers 431 that are arranged in a stacked manner. In addition, a frequency selective surface unit 411 is disposed on a top surface 4201 of the first dielectric structure 420, and it may include a plurality of patches 4111 arranged in one or more first patterns. The first pattern can be arranged on the top surface 4201 of the first dielectric structure 420 repeatedly. Each of the first pattern may be a two-dimensional array, in a fixed pattern or a dynamically adjusted pattern, and the plurality of patches 1111 in the same first pattern are equally spaced apart by a predetermined distance in the two-dimensional array so as to match the operating frequency of the antenna 450. Details of arranging the size of the patches 4111 and the gap between neighboring patches 4111 in the embodiment of FIG. 4A are similar to those in the embodiment of FIG. 1A, and thus are not repeated here.

For example, each of the first dielectric layers in the first dielectric structure 420 may be implemented using a first dielectric material having a first dielectric constant (e.g., Dk1), and each of the second dielectric layers in the second dielectric structure 430 may be implemented using a second dielectric material having a second dielectric constant (e.g., Dk2). The first dielectric constant (e.g., Dk1) is greater than the second dielectric constant (e.g., Dk2).

In some embodiments, the first thickness of the first dielectric structure 420 is less than the second thickness of the second dielectric structure 430 so as to focus the electromagnetic waves emitted by the antenna 450 and meet the resonant frequency. In addition, each first dielectric layer 421 in the first dielectric structure 420 may have a third thickness, and each second dielectric layer 431 in the second dielectric structure 430 may have a fourth thickness. It should be noted that the first thickness of the first dielectric structure 420 and the second thickness of the second dielectric layer 430 may correspond to the operating frequency of the antenna 450, and thus to the wavelength of the electromagnetic wave emitted by the antenna 450. Thus, the first dielectric structure 420 and the second dielectric layer 430 may have respective requirements for the first and second thicknesses.

Specifically, when manufacturing the antenna package structure 400, the first dielectric material and the second dielectric material provided by the supplier may be layered. Each layer of the first dielectric material may have a fifth thickness, and each layer of the second dielectric material may have a sixth thickness. If the first thickness required by the first dielectric structure 420 exceeds the fifth thickness of one layer of the first dielectric material, more than one layer of the first dielectric material is stacked to form the first dielectric structure 420 so as to meet the thickness requirement of the first dielectric structure 420, and each of the stacked layers in the first dielectric structure 420 can be referred to as each first dielectric layer 421.

Similarly, if the second thickness required by the second dielectric structure 430 is greater than the sixth thickness of one layer of the second dielectric material, more than one layer of the second dielectric material is stacked to form the second dielectric structure 430 so as to meet the thickness requirement of the second dielectric structure 430, and each of the stacked layers in the second dielectric structure 430 can be referred to as each second dielectric layer 431. In some embodiments, each layer of the first dielectric material may have different thicknesses, and each layer of the second dielectric material may also have different thicknesses. Thus, the first dielectric structure 420 may include a plurality of first dielectric layers 421 of different thicknesses, and the second dielectric structure 430 may include a plurality of second dielectric layers 431 of different thicknesses.

In some other embodiments, the first dielectric structure 420 may include at least one first dielectric layer 421, and the second dielectric structure 430 may include at least one second dielectric layer 431. In other words, the antenna package structure 400 shown in FIG. 4A may be similar to the antenna package structure 100 in FIG. 1A given that the first dielectric structure 420 includes one first dielectric layer 421 and the second dielectric structure 430 includes one second dielectric layer 431. In some other embodiments, the number of first electric layers 421 is less than the number of second electric layers 431.

In some embodiments, the patches 4111 in the frequency selective surface unit 411 and the substrate 440 may define a resonant cavity 460, as shown in FIG. 4A. The resonant cavity 460 can be applied to the embodiments of FIG. 4B and FIG. 4C where the connection element 412 is implemented using an adhesive 4124 (i.e., in FIG. 4B) or a plurality of soldering materials 4123 (i.e., in FIG. 4C).

Please refer to FIG. 4B. In some embodiments, the connection element 412 may include an adhesive 4124. For example, the adhesive 4124 may be a glue, cement, mucilage, or paste, but the present disclosure is not limited thereto. In some embodiments, the patches 4111 of the frequency selective surface unit 411 and the substrate 440 may define a resonant cavity 460. The electromagnetic wave focusing structure 410 may enhance the gain and directivity of the antenna 450.

Please refer to FIG. 4C. In some other embodiments, the connection element 412 may include one or more soldering materials 4123 and a filling material 4125. For example, one or more conductive pads 4122 may be disposed on the bottom surface 4301 of the second dielectric structure 430. Each soldering material 4123 may connect the corresponding conductive pad 4122 and the conductive element 442 so as to connect the electromagnetic wave focusing structure 410 to the substrate 440, as shown in FIG. 4C. It should be noted that the patches 4111 of the frequency selective surface unit 411 and the substrate 440 may define a resonant cavity. In addition, the bottom surface 4301 of the bottom most second dielectric layer 431 and the substrate 440 may define an air cavity 141. In some embodiments, the filling materials 4125 may be underfill. The soldering materials 4123 and the filling materials 4125 may be of different materials. In some other embodiments, the filling material 4125 may be an adhesive.

Specifically, the conductive element 442 is disposed on the top surface 4401 of the substrate 440, and the conductive element 442 may be implemented using a metal, such as gold (Au), silver (Ag), aluminum (Al), nickel (Ni), palladium (Pd), copper (Cu) or alloys thereof, but the present disclosure is not limited thereto. The conductive element 442 may include an antenna 450 and a plurality of conductive pads 454. There is a gap 452 between the antenna 450 and the conductive pad 454. The conductive pads 454 may be grounded so as to reduce interference to the electromagnetic waves emitted by the antenna 450. The antenna 450 may refer to a standalone antenna or a plurality of antennas (e.g., patch antennas) arranged in a two-dimensional array in the top view (not shown). In addition, the range of the frequency selective surface unit 411 may cover the range of the antenna 450 (or antenna pattern) so as to focus the electromagnetic waves emitted by the antenna 450.

Figure 5A:
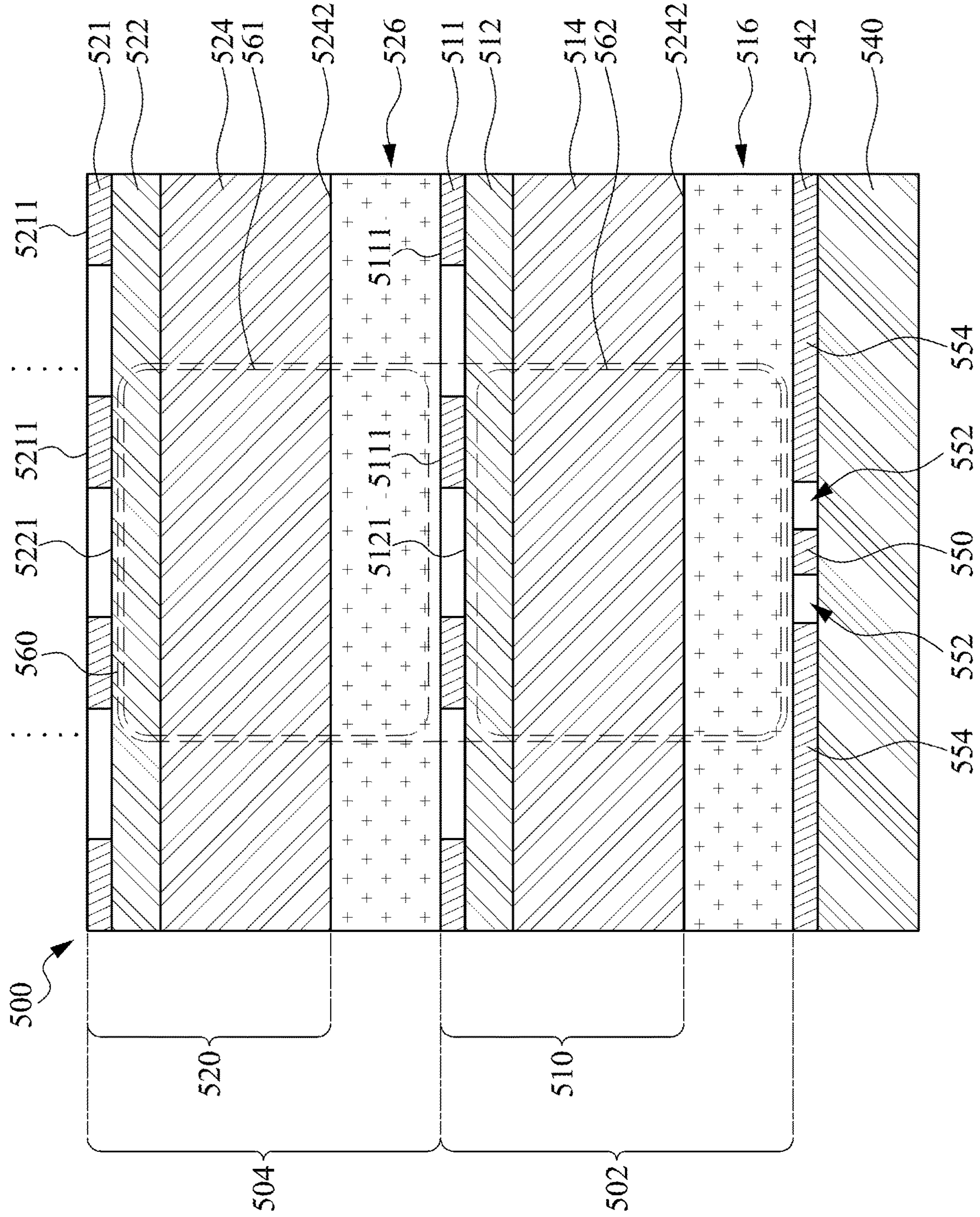
FIG. 5A illustrates a cross-sectional view of an antenna package structure in accordance with yet another embodiment of the present disclosure.
Figure 5B:
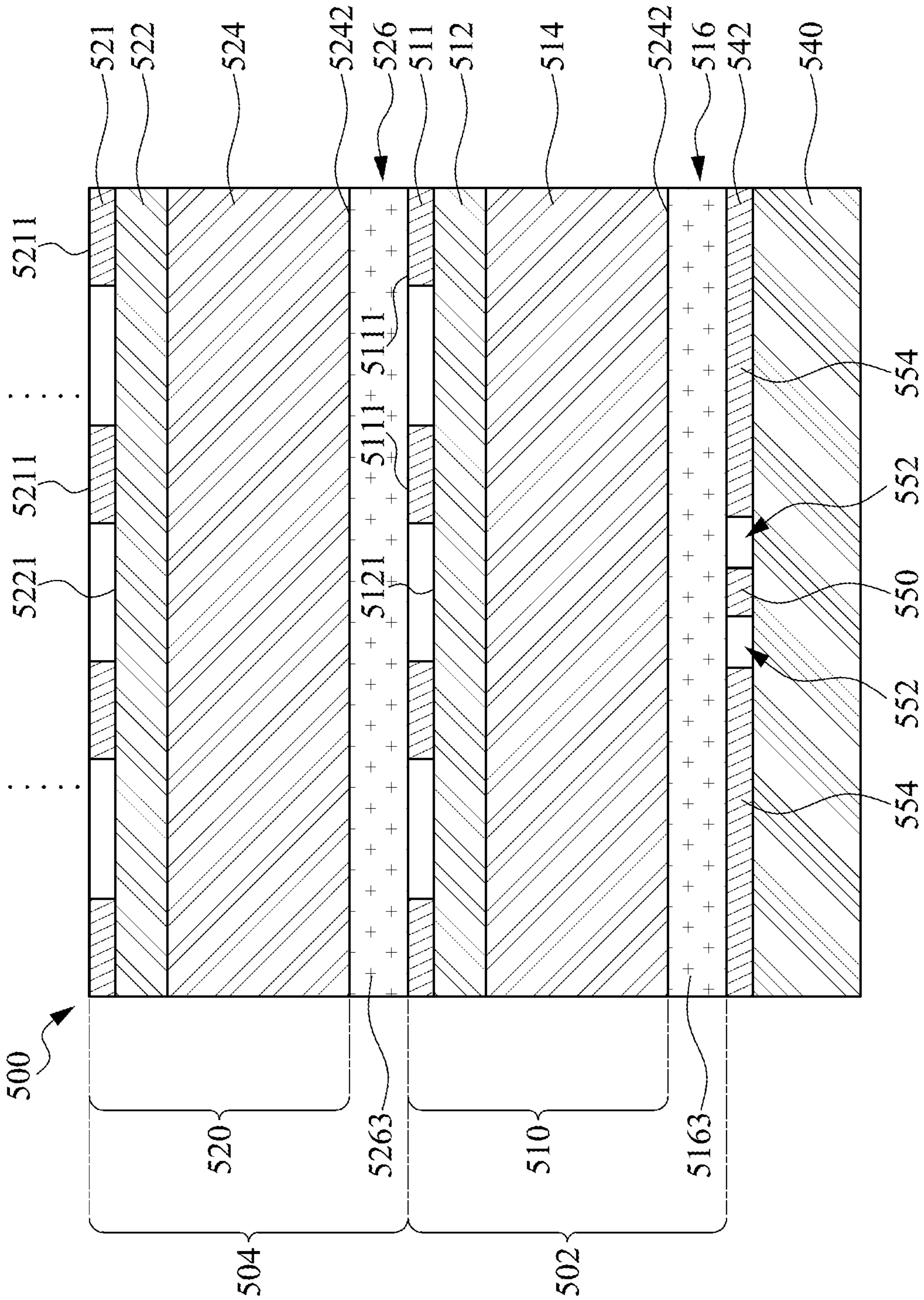
FIGS. 5B and 5C illustrates different cross-sectional views of the antenna package structure in accordance with the embodiment of FIG. 5A.
Figure 5C:
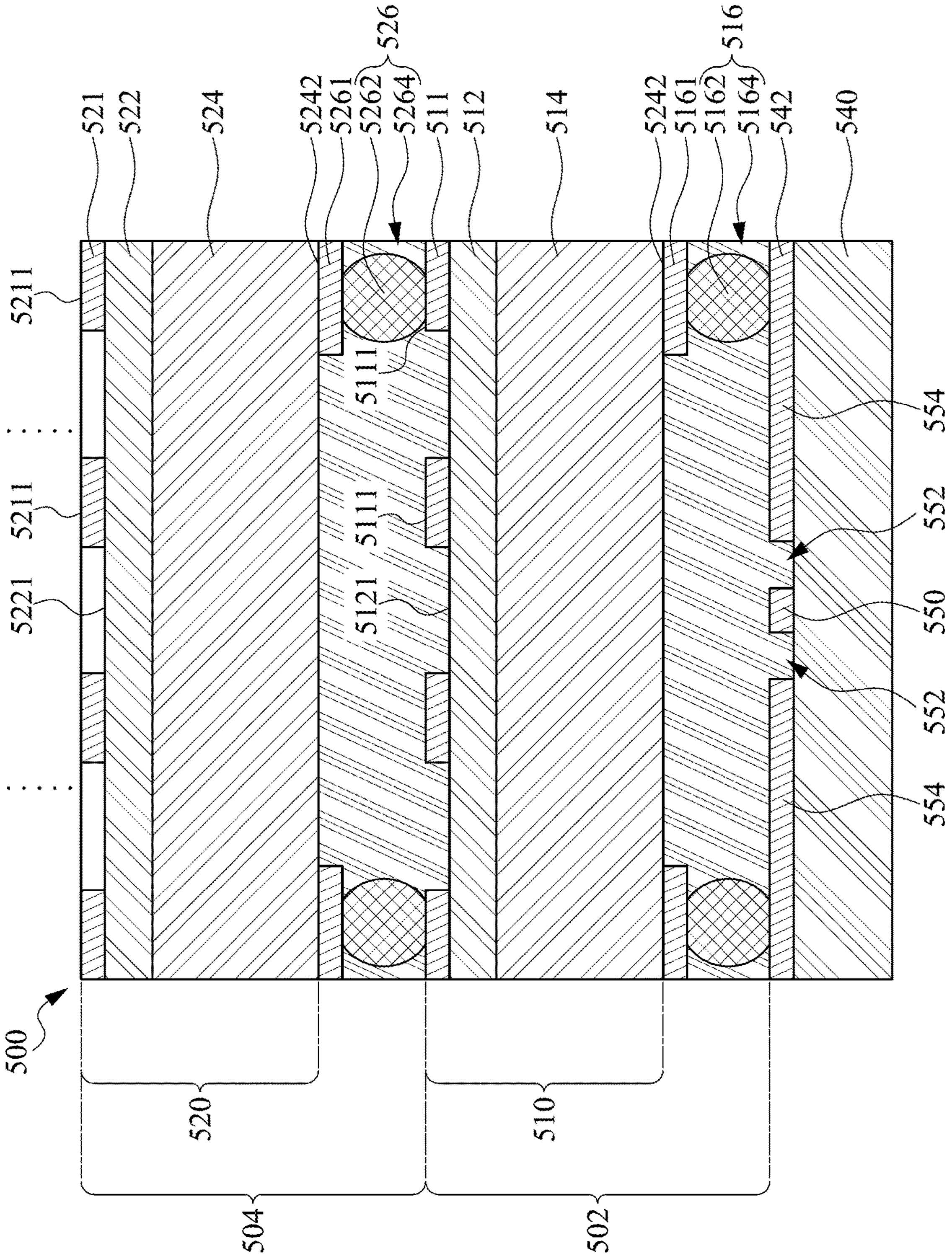

FIG. 5A illustrates a cross-sectional view of an antenna package structure in accordance with yet another embodiment of the present disclosure. FIGS. 5B and 5C illustrates different cross-sectional views of the antenna package structure in accordance with the embodiment of FIG. 5A. Please refer to FIGS. 5A-5C.

The antenna package structure 500 may include a first structure 502, a second structure 504, and a substrate 540, as shown in FIG. 5A. The first structure 502 may include an electromagnetic wave focusing structure 510 and a connection element 516. The electromagnetic wave focusing structure 510 may include a first dielectric layer 512 and a second dielectric layer 514. In addition, a frequency selective surface unit 511 is disposed on a top surface 5121 of the first dielectric layer 512, and may include a plurality of patches 5111 arranged in a first pattern. The first pattern may be a two-dimensional array, in a fixed pattern or a dynamically adjusted pattern, wherein the plurality of patches 5111 are equally spaced apart by a predetermined distance in the two-dimensional array so as to match the operating frequency of the antenna 550. Details of arranging the size of the patches 5111 and the gap between neighboring patches 5111 in the embodiment of FIG. 5A are similar to those in the embodiment of FIG. 1A, and thus are not repeated here.

In some embodiments, the first dielectric constant (e.g. Dk1) of the first dielectric material of the first dielectric layer 512 is greater than the second dielectric constant (e.g., Dk2) of the second dielectric material of the second dielectric layer 514. In other words, the relationship between the dielectric constants Dk1 and Dk2 can be expressed by formula (5) as follows.

$$Dk2<Dk1 \tag{5}$$

The first structure 504 may include an electromagnetic wave focusing structure 520 and a connection element 526. The electromagnetic wave focusing structure 520 may include a third dielectric layer 512 and a fourth dielectric layer 524. In addition, a frequency selective surface unit 521 is disposed on a top surface 5221 of the third dielectric layer 522, and may include a plurality of patches 5211 arranged in the first pattern or a second pattern different from the first pattern. The first pattern (or the second pattern) may be a two-dimensional array, in a fixed pattern or a dynamically adjusted pattern, with the plurality of patches 5211 equally spaced apart by a predetermined distance in the two-dimensional array so as to match the operating frequency of the antenna 550. In some embodiments, the connection element 526 may extend to the gaps between the patches 5111 of the frequency selective surface 511.

In some embodiments, the third dielectric constant (e.g. Dk3) of the third dielectric material of the third dielectric layer 522 is greater than the fourth dielectric constant (e.g., Dk4) of the fourth dielectric material of the fourth dielectric layer 524. In other words, the relationship between the dielectric constants Dk3 and Dk4 can be expressed by formula (6) as follows.

$$Dk4<Dk3 \tag{6}$$

It should be noted that although the electromagnetic wave focusing structures 510 and 520 are similar, the dielectric constants Dk1, Dk2, Dk3, and Dk4 of the dielectric layers 512, 514, 522, and 524 may have relative relationships so as to maintain the functionality of focusing the electromagnetic waves emitted by the antenna 550. Since the relationships between the dielectric constants Dk1 and Dk2, and between the dielectric constants Dk3 and Dk4 can be respectively expressed by formulae (5) and (6), the relationship between the dielectric constants Dk1 and Dk4 can be expressed by formula (7) as follows.

$$Dk1<Dk4 \tag{7}$$

Specifically, a dielectric layer at a relatively low position may have a relatively low dielectric constant, and the electromagnetic wave emitted by the antenna 550 may travel from one dielectric layer having a lower dielectric constant to another dielectric layer having a higher dielectric constant. Thus, the electromagnetic wave is refracted by the dielectric layer having a greater dielectric constant, and the refracted electromagnetic wave becomes closer to the normal of the boundary between these two dielectric layers of different dielectric constants. Therefore, the electromagnetic wave emitted by the antenna 550 can be focused by the electromagnetic wave focusing structures 510 and 520 in the antenna package structure 500.

It should be noted that the lower portion of the antenna package structure 500 in FIG. 5A, which includes the electromagnetic wave focusing structure 502 and the substrate 540, is similar to the antenna package structure 100 shown in FIG. 1A. The second structure 504 may be similar to the first structure 502, and it is stacked on the first structure 504 so as to enhance the gain and directivity of the electromagnetic waves emitted by the antenna 550. For example, the patches 5111 of the first electromagnetic wave focusing structure 510 and the substrate 540 may define a resonant cavity 562. In addition, the patches 5211 of the second electromagnetic wave focusing structure 520 and the first structure 502 may define another resonant cavity 561. The resonant cavities 561 and 562 can be collectively regarded as a resonant cavity 560. Thus, the gain and directivity of the electromagnetic waves emitted by the antenna 550 can be enhanced by the resonant cavity 562 for the first time, and then they are enhanced by the resonant cavity 561 for the second time. Therefore, the gain and directivity of the electromagnetic waves emitted by the antenna 550 can be improved using the antenna package structure 500.

Similar to the embodiments in FIGS. 1 to 4 described, the connection elements 516 and 526 can be implemented using adhesive 5163 and 5263, respectively, as shown in FIG. 5B. In some embodiments, the same adhesive can be used in the adhesives 5163 and 5263. In some other embodiments, the adhesive 5163 is different from the adhesive 5263. For example, the electromagnetic wave passing through the first structure 502 will enter the adhesive 5263. Since the adhesive 5263 has its own dielectric constant, the dielectric constant of the adhesive 5263 may be between the first dielectric constant Dk1 of the first dielectric layer 512 and the fourth dielectric constant Dk4 of the fourth dielectric layer 524, so the electromagnetic wave passing through the first structure 502 can be focused by the adhesive 5263, and then be focused by the electromagnetic wave focusing structure 520. In some embodiments, a first dielectric structure may include the third dielectric layer 522 and the fourth dielectric layer 524, and a second dielectric structure may include the first dielectric layer 512 and the second dielectric layer 514. In addition, the second dielectric structure may be disposed above the first dielectric structure, as shown in FIG. 5A.

Similar to the embodiments in FIGS. 1 to 4 described, the connection element 516 can also be implemented using one or more soldering materials 5162 and a filling material 5164, and the connection elements 526 can also be implemented using one or more soldering materials 5262 and a filling material 5264, as shown in FIG. 5C. For example, the frequency selective surface unit 511 may include a plurality of patches 5111 that are disposed on the top surface 5121 of the first dielectric layer 512, and a plurality of conductive pads 5261 are disposed on the bottom surface 5242 of the fourth dielectric layer 524. In some embodiments, the filling materials 5164 and 5264 may be underfills. The soldering materials 5162 and the filling material 5164 may be of different materials, and the soldering materials 5262 and the filling material 5264 may be of different materials. In some other embodiments, the filling materials 5164 and 5264 may be an adhesive. The soldering materials 5262 can connect one of the conductive pads 5261 to the corresponding patch 5111, thereby connecting the electromagnetic wave focusing structure 520 to the first structure 502. Similarly, a plurality of conductive pads 5161 are disposed on the bottom surface 5142 of the second dielectric layer 514, and the soldering materials 5162 can connect one of the conductive pads 5161 to the corresponding patch 554 in the conductive element 542, thereby connecting the electromagnetic wave focusing structure 510 to the substrate 540. In this case, the first structure 502 can be aligned with the second structure 504 using a self-assembly function or a self-alignment function of the soldering materials 5162 and 5262 so that the pattern of the patches 5211 in the frequency selective surface unit 521 can be substantially aligned with that of the patches 5111 in the frequency selective surface 511. In addition, the geometry center of the pattern of the patches 5211 in the frequency selective surface 512 may substantially align with that of the patches 5111 in the frequency selective surface 511.

It should be noted that the substrate 540 and the electromagnetic structures 510 and 520 are physically spaced apart, and can be manufactured individually and then assembled into the antenna package structure 500 using the connection elements 516 and 526. In addition, more than one second structure 504 can be stacked in the antenna package structure 500 using the connection element 526, and the number of stacked second structures 504 can be designed according to practical needs.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An antenna package structure, comprising:

an antenna, configured to radiate an electromagnetic wave;

a transmitting structure, comprising a first dielectric layer and a second dielectric layer of different dielectric constants, and a frequency selective surface unit; and a connection element connecting the antenna to the transmitting structure and configured to transmit the electromagnetic wave, wherein the first dielectric layer and the second dielectric layer are configured to focus the electromagnetic wave radiated between the antenna and the frequency selective surface unit, and wherein the connection element comprises a plurality of soldering materials.

2. The antenna package structure of claim 1, wherein the first dielectric layer and the second dielectric layer are disposed at different elevation with respect to the antenna.

3. The antenna package structure of claim 2, wherein a dielectric constant of the second dielectric layer is less than a dielectric constant of the first dielectric layer, the first dielectric layer is disposed between the second dielectric layer and the frequency selective surface unit.

4. The antenna package structure of claim 3, wherein a first thickness of the first dielectric layer is less than a second thickness of the second dielectric layer.

5. The antenna package structure of claim 1, further comprising a plurality of conductive elements disposed adjacent to the antenna, wherein the transmitting structure comprising a plurality of conductive pads connected to the plurality of conductive elements by the soldering materials.

6. The antenna package structure of claim 1, wherein the plurality of conductive elements are configured to be grounded.

7. The antenna package structure of claim 1, wherein the first dielectric layer and the second dielectric layer define a resonant cavity between the frequency selective surface unit and the antenna.

8. The antenna package structure of claim 1, wherein the frequency selective surface unit comprising a plurality of patterns spaced apart from each other and electrically coupling to the antenna.

9. The antenna package structure of claim 1, wherein a first geometry center of the antenna substantially aligns with a second geometry center of the frequency selective surface unit.

10. An antenna package structure, comprising:

an antenna;

a frequency selective surface unit, configured to electrically couple to the antenna;

a first dielectric structure disposed between the antenna and frequency selective surface unit, wherein the first dielectric structure has a first dielectric constant; and a second dielectric structure disposed between the first dielectric structure and the antenna, wherein the second dielectric structure comprises a plurality of second dielectric layers that have a second dielectric constant different from the first dielectric constant, and are arranged in a stacked manner, wherein the first dielectric structure comprises a plurality of first dielectric layers, and a first number of the first dielectric layers is different from a second number of the second dielectric layers.

11. The antenna package structure of claim 10, wherein a first thickness of at least one of the first dielectric layers is less than a second thickness of at least one of the second dielectric layers.

12. The antenna package structure of claim 10, further comprising:

a connection element connecting the antenna to the second dielectric structure, wherein a first thickness of the connection element is less than a second thickness of the second dielectric structure.

13. An antenna package structure, comprising:

a first frequency selective surface unit;

a second frequency selective surface unit configured for electrically coupling to the first frequency selective surface unit; and a first dielectric structure comprising a first dielectric layer and a second dielectric layer of different dielectric constants, wherein the first dielectric layer and the second dielectric layer are configured to focus a first electromagnetic wave transmitted between the first frequency selective surface unit and the second frequency selective surface unit.

14. The antenna package structure of claim 13, further comprising:

an antenna, configured to electrically coupled to a first frequency selective surface unit; and a second dielectric structure comprising a third dielectric layer and a fourth dielectric layer of different dielectric constants, wherein the third dielectric layer and the fourth dielectric layer are configured to focus a second electromagnetic wave transmitted between the first frequency selective surface unit and antenna.

15. The antenna package structure of claim 14, wherein:

the second dielectric layer is disposed between the first dielectric layer and the first frequency selective surface unit, and a second dielectric constant of the second dielectric layer is less than a first dielectric constant of the first dielectric layer; and the third dielectric layer is disposed between the fourth dielectric layer and the first frequency selective surface unit, and a fourth dielectric constant of the fourth dielectric layer is less than a third dielectric constant of the third dielectric layer.

16. The antenna package structure of claim 15, wherein the fourth dielectric constant of the fourth dielectric layer is less than the first dielectric constant of the first dielectric layer.

* * * * *